United States Patent [19]

Ames

[11] 3,728,885
[45] Apr. 24, 1973

[54] TUBE BENDING AND SAWING APPARATUS

[75] Inventor: Ward A. Ames, Danville, Ill.

[73] Assignee: Tridan Tool & Machine, Inc., Danville, Ill.

[22] Filed: Dec. 11, 1970

[21] Appl. No.: 97,253

[52] U.S. Cl. ..................................................72/294
[51] Int. Cl. ..............................................B21d 43/28
[58] Field of Search..................72/294, 150, 152, 72/203, 217, 334

[56] References Cited

UNITED STATES PATENTS

| | | | |
|---|---|---|---|
| 3,145,756 | 8/1964 | Hill | 72/DIG. 22 |
| 3,344,639 | 10/1967 | Sassak | 72/150 |
| 3,066,718 | 12/1962 | Chausson | 72/294 |
| 2,583,404 | 8/1948 | Wyrfel | 72/427 |
| 3,438,237 | 4/1969 | Sisler | 72/217 |
| 3,299,681 | 1/1967 | Hautau | 72/7 |
| 2,974,706 | 3/1961 | De Witt | 72/150 |
| 2,792,048 | 5/1957 | Fuchs | 72/150 |

Primary Examiner—Charles W. Lanham
Assistant Examiner—Michael J. Keenan
Attorney—Woodard, Weikart, Emhardt & Naughton

[57] ABSTRACT

An apparatus for bending and/or sawing tubes to a desired configuration. Tube guides route continuous lengths of tubing to a clamp unit, a feed unit and a bend clamp. The feed unit is slidable on rails for pulling the desired tube lengths through the clamp unit where they are then held in place by the clamp unit and bend clamp. A mandrel and wiper block is engageable with the ends of the tubes and is rotatable about a bend block for bending the tubes to the desired configuration. A circular saw cuts the configured tubes from the continuous lengths of tubing. Stripper rods force the cut tubes from the apparatus.

12 Claims, 13 Drawing Figures

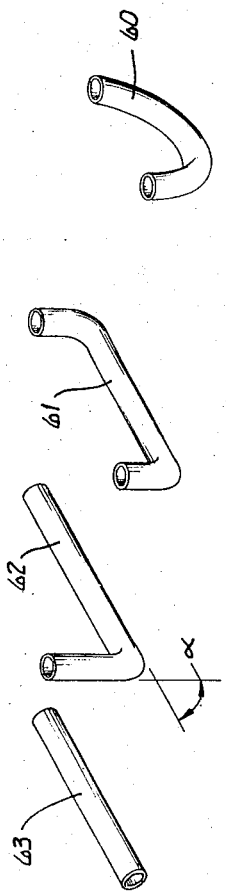
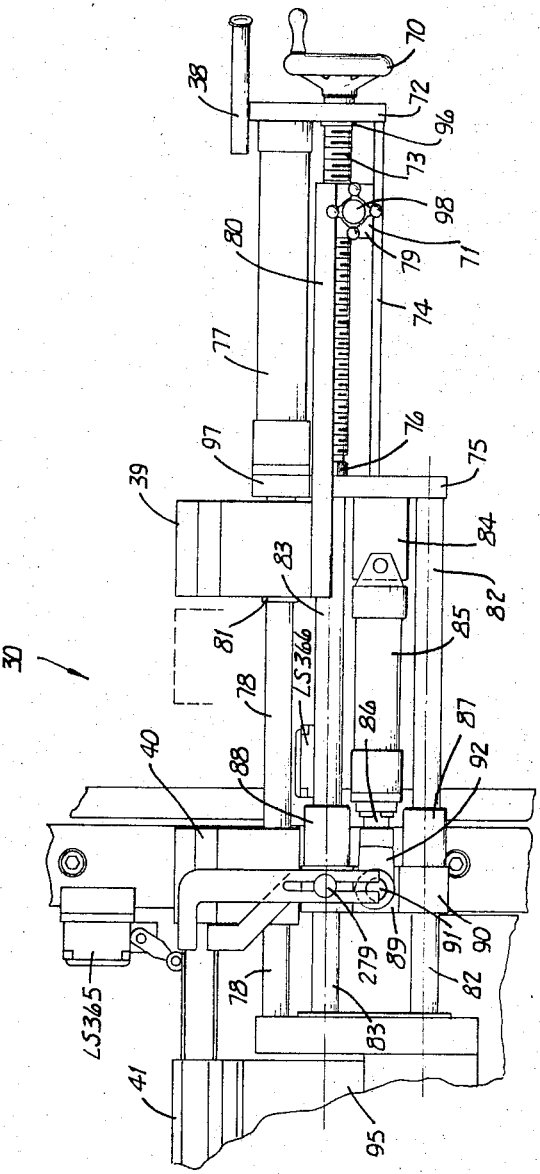

INVENTOR
WARD A. AMES
BY
Woodard Weikart Emhardt & Naughton
ATTORNEYS

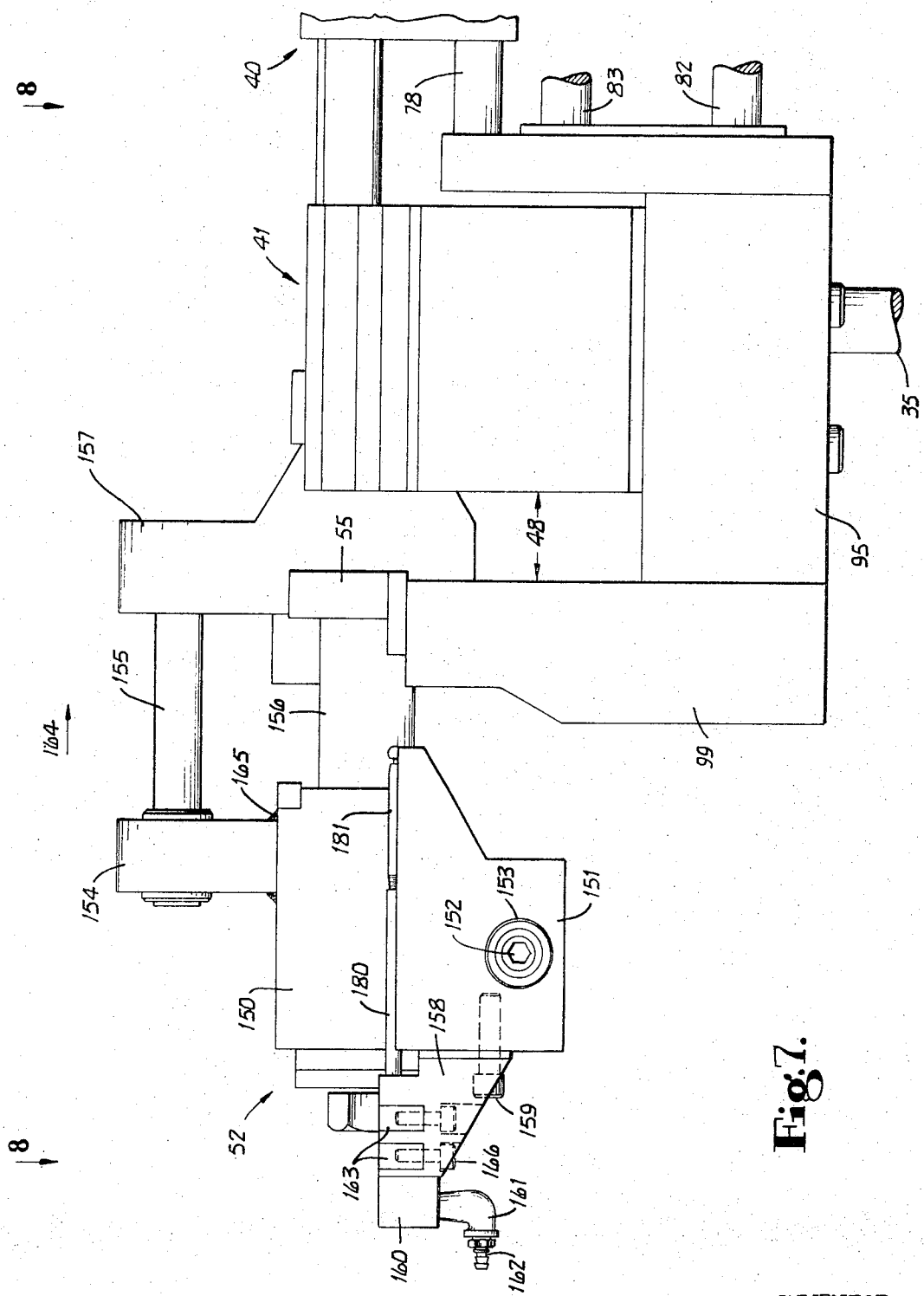

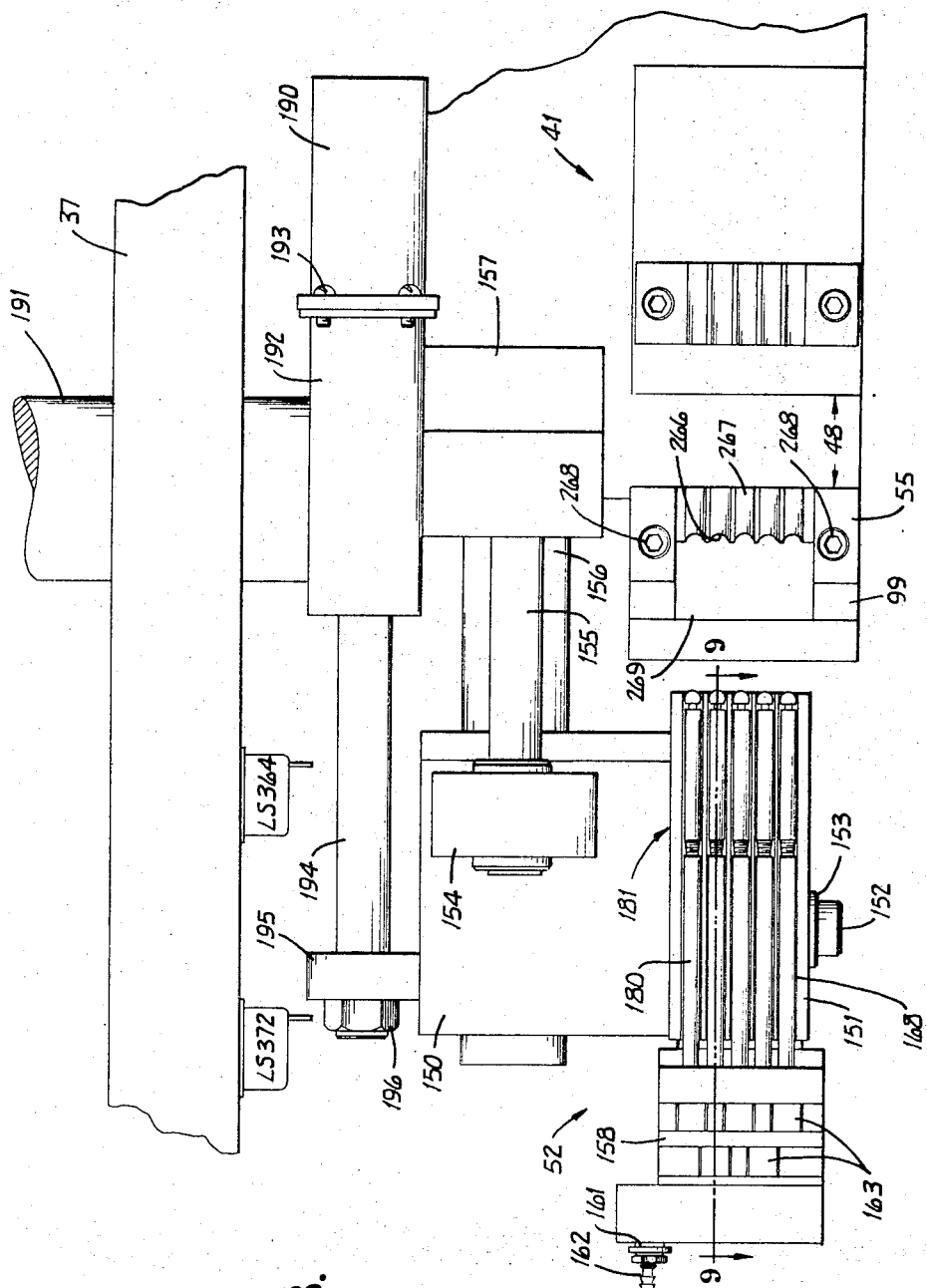

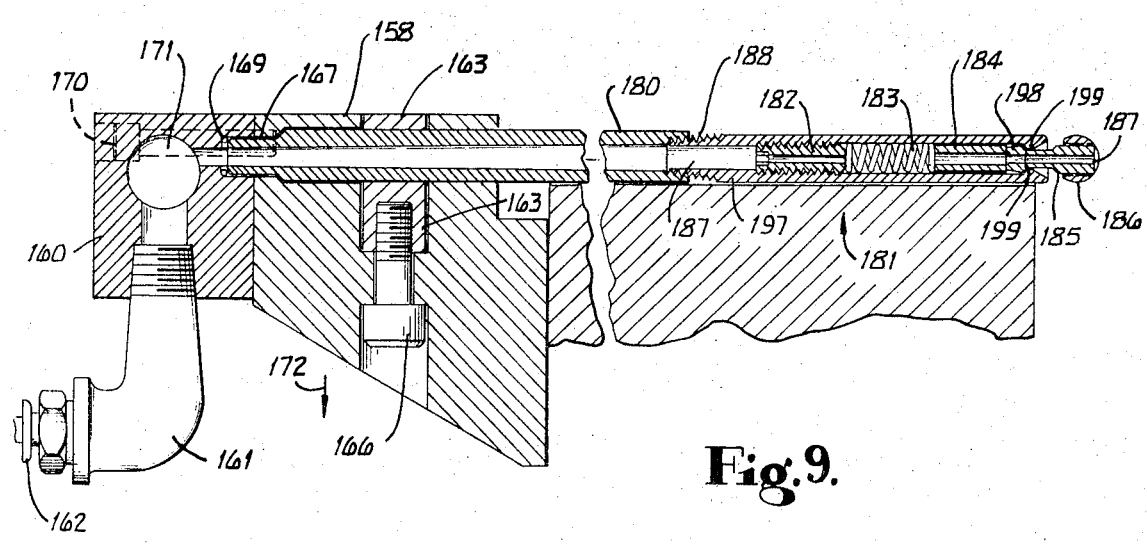

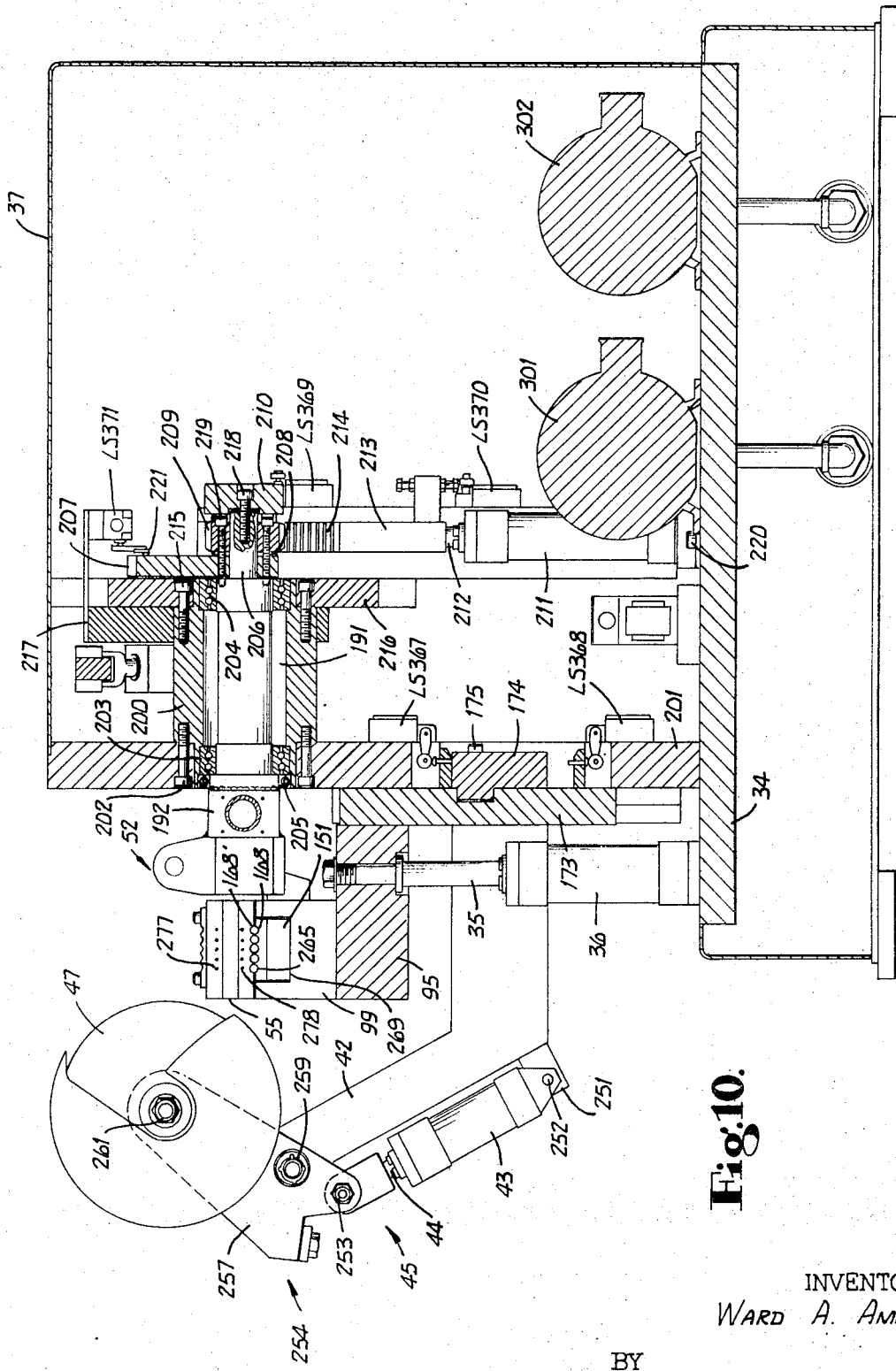

3,728,885

TUBE BENDING AND SAWING APPARATUS

BACKGROUND OF THE INVENTION

1. Field of the Invention

This invention is an apparatus for bending and/or sawing tubes.

2. Description of the Prior Art

Heat exchangers are employed in numerous applications. The most common applications are heating and cooling systems for human comfort, refrigeration systems for food and other perishables and industrial process control.

These heat exchangers in most systems employ as a part of their construction small diameter copper or aluminum tubes as a means of circulating the heating or cooling medium. These tubes must be bent in special shapes in order that they may circulate such mediums in a generally serpentine manner.

The configurations of these special tube bends must also allow for their assembly and fabrication into the heat exchanger. The most common type of heat exchangers utilizing these special tubing shapes are referred to as plate-fin heat exchangers.

For heat exchangers the internal tube passages should have a general uniform diameter through the various bends to insure uninterrupted flow of the heating or cooling medium. As a result, the bending of the tubes must be carefully controlled.

Various configurations of the tubes, such as straights, elbows, return bends and dual 90° bends, hereinafter referred to as crossovers (FIG. 2), are required by manufacturers in large quantities. Heretofore, a single machine has not been available which will produce the crossover tubes 61 and the straight length 63 as well as the return bends 60 and the elbow configured tubes 62. This specification discloses a machine which has the capability to produce all of these tubes.

SUMMARY OF THE INVENTION

This invention is a tube bending and sawing apparatus. A vertically movable main body supports tube guides, a clamp unit, a feed unit and a bend clamp. The tube guides are hollow and route continuous lengths of tubing through a clamp unit to a feed unit. The feed unit is slidable on a pair of rails and has a clamping device for holding the tubing as the feed unit moves towards a bend clamp. Hydraulically operated clamps within the clamp unit and bend clamp hold the tubing while the bending and cutting operations are performed. A mandrel and wiper block has rods engageable with the ends of the tubes and is rotatable about a bend block for bending the tubes to the desired configuration. A saw cuts the configured tubes from the continuous lengths of tubing. Stripper rods force the cut tubes from the apparatus. Various limit switches and stops are provided to provide an automatic operation.

It is an object of the present invention to provide an apparatus which will produce straight lengths of tubes, elbow configured tubes, semicircular configured tubes, and crossover tubes from continuous lengths of tubing.

It is a further object of the present invention to provide the previously described apparatus which will also produce elbow configured tubes having a controlled angle of bend.

Yet another object of the present invention is to provide the previously described apparatus which may be automatically or manually operated.

A further object of the present invention is to provide the previously described apparatus which will bend and cut multiple lengths of tubing simultaneously.

Related objects and advantages of the present invention will be apparent from the following description.

BRIEF DESCRIPTION OF THE DRAWING

FIG. 2 is a perspective view of the differently configured tubes producible with the apparatus of FIG. 1.

FIG. 3 is a more detailed and enlarged view of the front right portion of the apparatus of FIG. 1.

FIG. 7 is a more detailed and enlarged view of the front left portion of the apparatus of FIG. 1 with saw assembly 45 removed and viewed along the line 7—7 in the direction of the arrows.

FIG. 8 is a top view of the portion of the apparatus shown in FIG. 7 and is viewed in the direction of arrows 8—8.

FIG. 9 is an enlarged sectional view taken along the line 9—9 of FIG. 8 and viewed in the direction of the arrows.

FIG. 10 is a detailed sectional view of the apparatus of FIG. 1 taken along the line 10—10 and viewed in the direction of the arrows.

FIG. 11 is a perspective view of adjustable stop assembly 217 shown in FIG. 10.

DESCRIPTION OF THE PREFERRED EMBODIMENT

Figure 1:
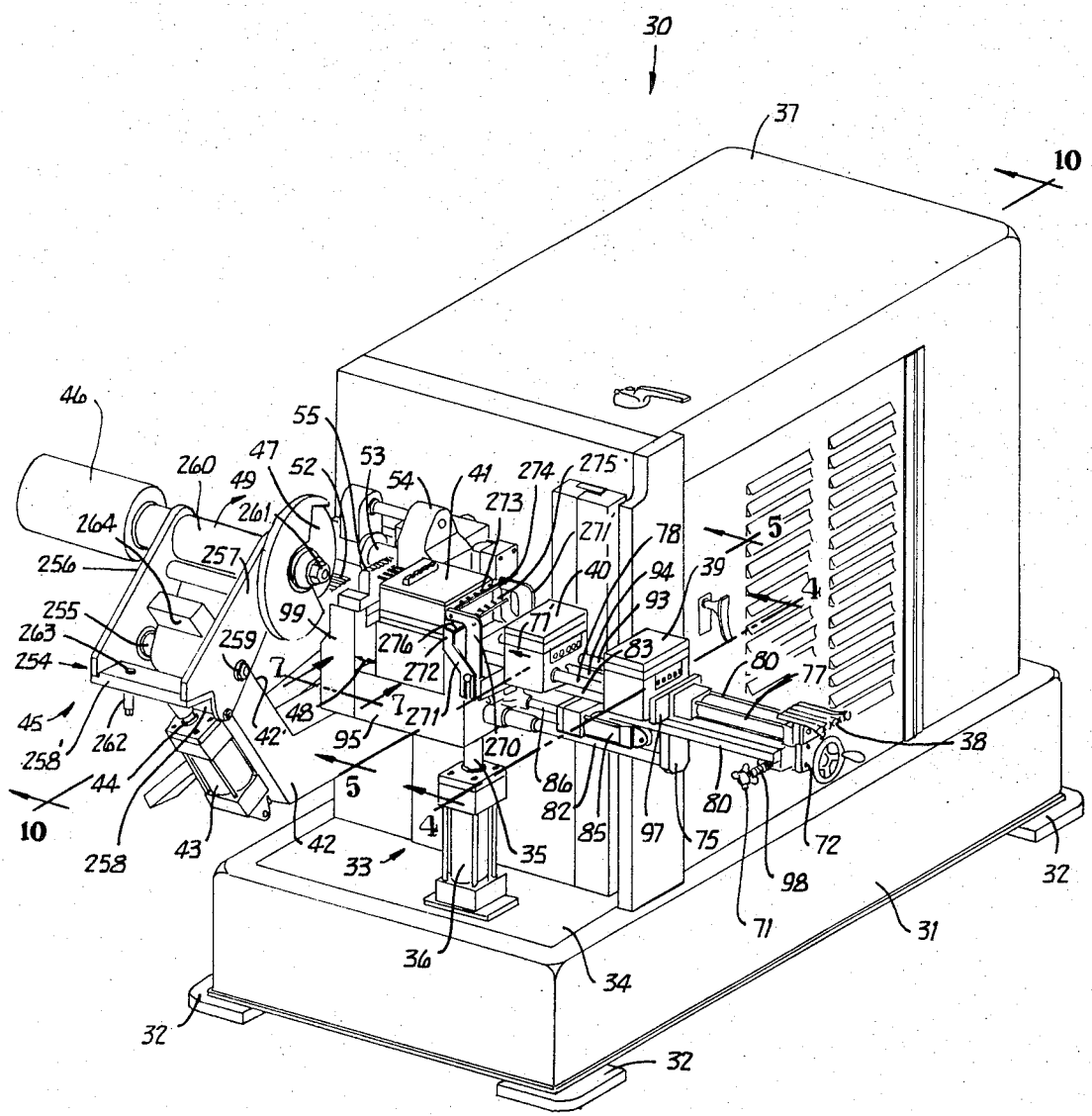
FIG. 1 is a perspective view of the bending and sawing apparatus of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

GENERAL OPERATION

Referring now more particularly to FIG. 1, there is illustrated an automatic tube bending machine 30 for producing the four differently configured hollow tubes shown in FIG. 2. The return bend 60 is continuously radiused a full 180° whereas crossover tube 61 has a straight section connected between two 90° bends.

Machine 30 also produces the straight tube 63 and an elbow shaped tube 62 which may have legs of different lengths joined through a bend angle alpha varying from 0° to 90°. The machine will provide multiple tubes of the same configuration. For example, the machine shown in the drawing has a capacity to simultaneously provide a maximum of five tubes of the same configuration.

The machine is mounted on a base 31 with mounting feet 32 for fastening to a suitable horizontal surface. Mounted to the top base plate 34 is cabinet 37 for housing various electrical and hydraulic devices. In front of cabinet 37 is the feed and clamp assembly 33 which is movable up and down on rod 35 of a hydraulic cylinder 36 mounted to plate 34. Limit switch LS371 (FIG. 10) operates cylinder 36. The feed and clamp assembly 33 receives up to a maximum of five continuous lengths of tubing through tube guides 38. The tubing may be supplied from a source such as a spindle located to the right of the machine as viewed in FIG. 1. In order to illustrate the machine with greater clarity, the tubing and spindle have been omitted from the drawing. The continuous lengths of tubing then pass through clamp unit 39, feed unit 40, bend clamp 41, and bend block assembly 55 where they are held in place for bending and cutting operations. A mandrel and wiper block 52 mounted to rod 53, only partially shown in FIG. 1, move toward bend block assembly 55 and is revolved by spindle assembly 54 around assembly 55 thereby producing the tube bending angle desired. After the bending operation, mandrel and wiper blocks 52 are retracted to prevent damage to both them and saw blade 47 during operation. Tube cutting is accomplished by a saw spindle assembly 45 mounted to arm 42 projecting upwardly from cabinet 37. Saw spindle assembly 45 is connected to hydraulic cylinder 43 by rod 44 and is revolved in the direction of arrow 49 until saw blade 47 enters space 48 cutting the tubing. Blade 47 is powered by a suitable motor 46. In order to fully understand the principles of operation, the major individual operating components will now be described.

FEED AND CLAMP UNITS

Fixedly attached to a movable frame which is the main body 95 of feed clamp assembly 33, as shown in FIG. 1, are four rails 78, 82, 83 and 93. These four rails are fixedly attached at their opposite ends to a T-shaped plate 75. Rails 78, 82, 83 and 93 may be attached to main body 95 and plate 75 by any number of means. For example, the rails may be threaded on both ends into complementary threaded sockets in body 95 and plate 75. A hydraulic cylinder 77 is mounted between plates 72 and 75 with a slidable piston rod 94 freely projecting through plate 75 and clamp unit 39 and being fixedly fastened to feed unit 40. Cylinder 77 may be fastened between plates 72 and 75 by having its flanged ends welded to the plates.

Referring now to FIG. 3, a supporting rib 74 is fixedly fastened between plates 72 and 75. Rotatably mounted to plates 72 and 75 and between rib 74 and hydraulic cylinder 77 is screw 73. An adjustment crank 70 is fixedly fastened to one end of screw 73 while the opposite end of the screw is rotatable in bearing 76 fixedly mounted to plate 75. Bearing 76 is mounted to plate 75 allowing screw 73 to freely rotate therein. Threaded on screw 73 is block 79 which carries locking handle 71. The threads on screw 73 are located only between plates 72 and 75 so that rotation of handle 70 causes block 79 to move horizontally while the distances between plates 72 and 75 remains fixed. Rib 74 is adjacent the bottom surface of block 79 preventing the block from rotating as screw 73 turns. Welded to the sides of block 79 are ribs 80 which are fixedly fastened to clamp unit 39. Since FIG. 3 is a side view, only one rib is shown; however, a second rib is shown in FIG. 1. Ribs 80 freely pass beneath the horizontal arms 97 of T-shaped member 75. Thus, as handle 70 is turned, block 79 will advance horizontally forcing clamp unit 39 to move towards or away from feed unit 40. As will be evident later, this enables the user to control the length of the configured tubes produced by the machine. Once the desired length has been chosen, screw 73 is prevented from turning by tightening handle 71. Handle 71 is fixed to threaded shaft 98 which in turn passes through a clearance hole in block 79 which extends from side nearest handle 71 to a split extending from bottom of block 79 to threaded hole through which screw 73 passes. Beyond split, and extending to side of block 79 farthest from handle 71, is a tapped hole which shaft 98 is threaded into. By turning handle 71, the two halves of block 79 are pulled together clamping onto screw 73.

Clamp unit 39 and feed unit 40 are identical in construction with the exception that cylinder rod 94 freely passes through the clamp unit and is fixedly fastened to the feed unit. Both units 39 and 40 are slidable on rails 78 and 93.

Figure 4:
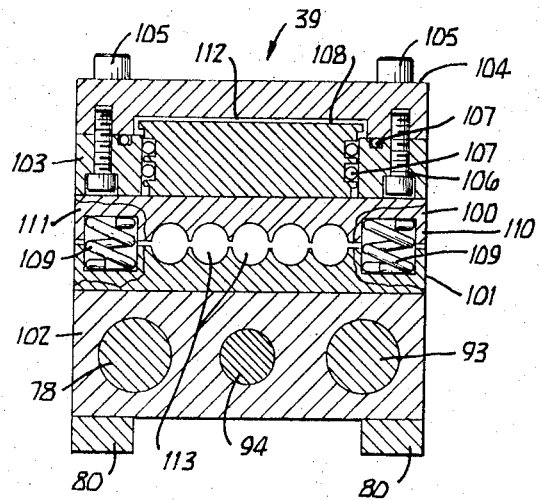
FIG. 4 is an enlarged sectional view of clamp unit 39 of FIG. 1 taken along the line 4—4 and viewed in the direction of the arrows.

A cross sectional view of clamp unit 39 taken along the line 4—4 of FIG. 1 is shown in FIG. 4. Unit 39 has a base 102 securely fastened to plate 103 and cap 104 by four bolts 105. A bolt is located in each corner of the top of cap 104 passing through unthreaded holes in cap 104 and plate 103 and being threaded into base 102. The entire assembly is slidable on rails 78 and 93 with cylinder rod 94 passing therethrough and being anchored to feed unit 40. A movable clamp block 100 and stationary clamp block 101 have horizontal through holes 113 for receiving the tubes from tube guides 38 (FIG. 1). Clamp block 101 is securely fastened to base 102 with movable block 100 being spaced from block 101 by four springs 109, two of which are shown in cutaway portions 110 and 111. A piston 108 slidable in cavity 112 formed within cap 104 and plate 103 is movable down against clamp block 100 when hydraulic pressure is provided from a central source through a tube in cap 104 to cavity 112. Thus, application of pressure to piston 108 forces movable clamp block 100 to abut against stationary clamp block 101 thereby tightly retaining the tubes within holes 113. Holes 113 are contoured to retain the tubes with minimum deformation. To release the tubes from holes 113, the pressure is released from cavity 112 and springs 109 force blocks 100 and 101 apart. To insure against premature leakage of pressure, seals 107 seal piston 108 to plate 103 and plate 103 to cap 104. Bolts 106 fasten cap 104 and plate 103 together. Fastened to the bottom of base 102 by welding or other suitable means are ribs 80 connecting unit 39 to block 79 (FIG. 1).

Feed unit 40 is identical in construction with clamp unit 39 except that piston rod 94 passes freely through the base of clamp unit 39 and is anchored to the base of feed unit 40. In addition, ribs 80 are not attached to feed unit 40. The clamp and feed unit operate in unison to pull a predetermined length of continuous tubing through tube guides 38. The operation of these two units will be explained later in this specification. As may be seen from FIG. 4, clamp blocks 100 and 101 may be easily removed from the unit thereby allowing installation of clamp blocks having different sized holes 113 which will accommodate different sized tubing.

BEND CLAMP

Figure 5:
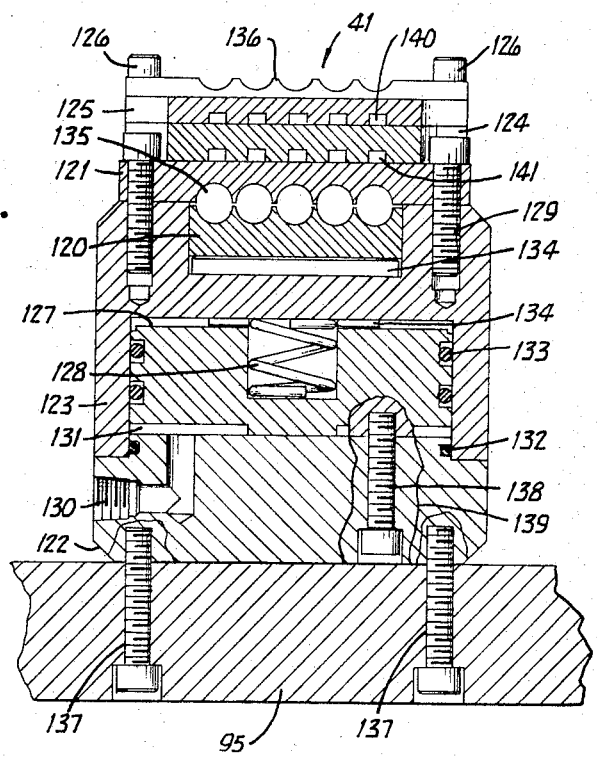
FIG. 5 is an enlarged sectional view of bend clamp 41 of FIG. 1 taken along the line 5—5 and viewed in the direction of the arrows.
Figure 6:
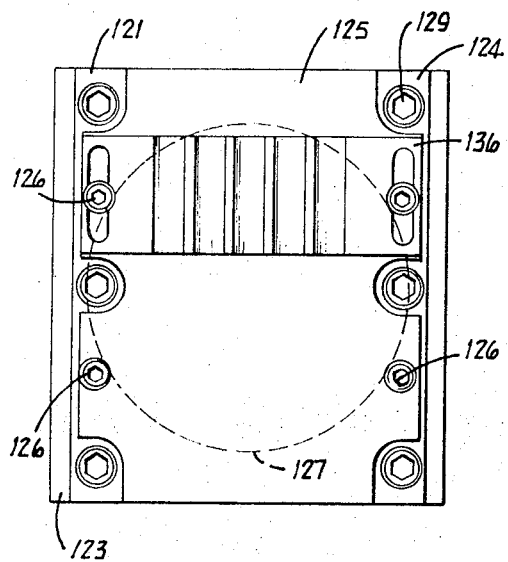
FIG. 6 is a top view of the bend clamp of FIG. 5.

The tube supplied through tube guides 38 (FIG. 1), clamp unit 39 and feed unit 40 is then routed through bend clamp 41 where it is securely held while bent and cut to the desired configuration. Bend clamp 41 is very similar to units 39 and 40; however, clamp 41 does not slide on rails and is instead securely fastened by bolts or other suitable means to main body 95 mounted atop rod 35 of hydraulic cylinder 36 (FIG. 1). A cross section of bend clamp 41 taken along the line 5—5 of FIG. 1 and viewed in the direction of the arrows is shown in FIG. 5. Bend clamp 41 is secured to main body 95 by bolts 137 which are threaded into base 122. Bend clamp 41 has an intermediate member 123 secured to base 122 by bolts 138 shown in cutaway section 139. Bolts 138 extend freely through base 122 and are threaded into the bottom of intermediate member 123. Fastened to the top of member 123 by bolts 129 is stationary clamp block 121. Referring now also to FIG. 6, which is a top view of bend clamp 41, it may be seen that upper stripper guide 125 is mounted to the top of lower stripper guide 124 with four bolts 126 fastening the two guides to clamp block 121 and intermediate member 123. Bolts 126 pass freely through guides 124 and 125 and clamp block 121 and are threaded into the top of intermediate member 123. Mounted to the top of upper stripper guide 125 is mandrel stripper 136. Two of the bolts 126 secure stripper 136 to guides 124 and 125, block 121 and member 123. A movable clamp block 120 is contained with intermediate member 123 and rests atop two spacers 134 which rest directly on top of piston 127, passing through clearance holes, on each side of center, in member 123. The spring 128 abuts against member 123 and is seated in a receiving cavity atop piston 127. Application of hydraulic pressure through tube 130 to annular cavity 131 forces piston 127, spacer 134 and movable clamp block 120 upward, compressing spring 128. When hydraulic pressure in cavity 131 is released, spring 128 causes piston 127 to move downward thus separating clamp block 120 and 121 releasing tube from holes 135. Seals 133 prevent escape of pressure through the junction of piston 127 and intermediate member 123. Seals 132 prevent escape of pressure through the junction of intermediate member 123 and base 122. Clamp blocks 120 and 121 are contoured similar to the clamp blocks of clamp unit 39 and feed unit 40 to prevent deformation of the tubes during the clamping operation. Holes 140 and 141 are provided in upper stripper guide 125 and lower stripper guide 124 to receive the finger like elements of the stripper to be described later in the specification. As may be seen from FIG. 5, feed clamp 41 may be disassembled in a manner similar to feed unit 40 and clamp unit 39 in order to remove and replace clamp blocks 120 and 121 to receive different sizes of tubes.

BENDING APPARATUS

Referring once again to FIG. 1, gap 48 is provided between the edge of bend clamp 41 and wall 99 of main body 95 to allow saw blade 47 access to cut the tubes exiting bend clamp 41. Prior to the sawing operation, the tubes are bent to the desired configuration. The bending apparatus does not extend out of bend clamp 41, but is a separate assembly with its relationship to clamp 41 and bend block 55 held to very close tolerances. FIG. 7 shows the apparatus used to bend the tubes projecting out of bend clamp 41. FIG. 7 is a view along the lines 7—7 of FIG. 1 with saw assembly 45 removed.

A mandrel and wiper block 52 is horizontally movable to wall 99 of main body 95 in the direction of arrow 164. Notch 269 (FIGS. 8 and 10) is provided to allow wiper block 151 to pass through and under bend block 55. As the tubes to be bent exit bend clamp 41, they cross gap 48 and pass through holes 265 (FIG. 10) formed by grooves 168 (FIG. 8) of block 151 and grooves 168' in the bottom of bend block 55. The tubes engage mandrel assemblies 181 and the entire mandrel and wiper block 52 is then rotated clockwise thereby bending the tubes upward.

Referring now to FIG. 7 and 8, mandrel and wiper block 52 has a wiper block 151 fastened to mandrel mount block 150 by bolt 152 which passes through an unthreaded hole in block 151 and is threaded into block 152. Washer 153 is provided under the head of bolt 152. An ear 154 is fastened by welds 165 to the top of block 150 with a hole extending therethrough for slidably receiving rail 155 fixedly fastened to bend head spindle block 157. Conventional rod bearings are provided in ear 154 to allow the ear and attached structure to freely slide on rail 155. A second larger diametered rail 156 is also fixedly fastened to bend head spindle block 157 beneath and parallel with rail 155. Rail 156 passes through a hole extending through mandrel mount block 150. Conventional rod bearings are also provided in block 150 to allow the block and attached structure to freely slide on rail 156.

Power to move mandrel and wiper block 52 to and from bend block 55 on rails 155 and 156 is provided by hydraulic cylinder 190 (FIG. 8) mounted by fasteners 193 to mounting block 192 welded to spindle 191 extending through the front wall of cabinet 37. Piston rod 194 of hydraulic cylinder 190 extends freely through block 192 and is fastened to flange 195 welded to the back of mandrel mount block 150. Fastener 196 is threaded onto the end of rod 194 preventing flange 195 from disengaging rod 194. Thus, activation of cylinder 190 provides for the horizontal movement of mandrel and wiper block 52. As will be described later, rotation of spindle 191 results in a rotation of mandrel and wiper block 52 about bend block 55 thereby bending the tubes to the desired configuration.

Fastened to wiper block 151 is mandrel clamp block 158. Bolts 159 (FIG. 7) extending through block 158 are threaded into block 151 thereby securing the two blocks together. Block 158 has five clamps 163 fitted within slots on its top and secured by bolts 166. Clamps 163 have through holes sized to receive mandrel rods 180 which are fitted onto mandrel assemblies 181.

A cross sectional view of the mandrel rod and assembly taken along the line 9—9 of FIG. 8 and viewed in the direction of the arrows is shown in FIG. 9. The body 197 of mandrel assembly 181 has an outside diameter slightly less than the inside diameter of the tube to be bent thereby enabling body 197 to slide within the tube for holding the tube during the bending process. Body 197 is hollow having spring 183 captive within it between set screw 182 and spacer 184. A ball 186 is threaded onto screw 185 having its head 198 within body 197 between spacer 184 and necked down portion 199 of body 197. Body 197 has machine threads 188 on one end for threading into mandrel rod 180. Hole 187 extends completely through body 197 and rod 180 allowing oil within chamber 171 of oiler block 160 to exit the tip of ball 186. The oil reduces the friction encountered when ball 186 enters or exits the inside of the tubes to be bent. Rods 180 extend through holes in clamps 163 and mandrel clamp block 158 (FIG. 9) having ends resting in counterbores 167 provided in oiler block 160. Clamps 163 fit in slots in block 158 being pulled down in the direction of arrow 172 by bolts 166. Mandrel rods 180 and mandrel body 197 are approximately the same size. The mandrel rod 180 passes through a hole in mandrel clamp block 158 and a hole in clamp 163. When screw 166 is tightened, clamp 163 is drawn down, clamping mandrel rod 180 between top surface of hole in clamp 163 and bottom surfaces of hole in clamp block 158. The mandrel rod 180 and body 197 are held above grooves 168 and amount equal to the wall thickness of the tube being bent. Of course, seals are employed throughout the mandrel and wiper block 52 to prevent oil leakage. One such seal 169 is shown in FIG. 9 sealing the end of rod 180 to counterbore 167. Cavity 171 connects the hollow center of each rod 180 with the source of oil routed through a conventional hose (not shown) connected to fitting 162 of elbow 161 threadedly received into cavity 171 of block 160. Block 160 is fastened to block 158 by bolts 170 threadedly received into block 158.

As previously mentioned, the entire mandrel and wiper block 52 is rotated in order to bend the tubes to the desired configuration. FIG. 10 is a section taken along the line 10—10 of FIG. 1 and viewed in the direction of the arrows particularly showing the apparatus used to rotate mandrel and wiper block 52. Mounting block 192 is fixedly fastened to the end of spindle 191 by welding or other suitable means. Spindle 191 is rotatably mounted within cylinder shaped bearing housing 200 which is fastened to front wall 201 of cabinet 37 by bolts 202. Conventional bearings 203 and 204 are mounted at both ends of cyoinder 200 allowing spindle 191 to freely rotate therein. Seal 205 is fitted into the end of housing 200 to prevent foreign matter from entering bearing housing 200. Bearing 203 is retained by shoulder on spindle 191. End 206 of spindle 191 is necked down and extends through stop block 207, thrust washer 208 and spur gear 209. A cap or rotor fitting 210 has a counterbore for receiving the end of spindle 191 and is secured thereon by fastener 218 which is threadedly received by spindle 191. Bolts 219 secure gear 209, washer 208, and block 207 to spindle 191. Spur gear 209 meshingly engages teeth 214 of rack 213 fastened to the top end of piston rod 212 of hydraulic cylinder 211 to base plate 34 by bolts 220. Thus, activation of cylinder 211 causes rod 212 and rack 213 to move vertically causing gear 209, spindle 191 and mandrel and wiper block 52 to rotate. As a result, the tubes extending out of holes 265 formed between wiper block 151 and bend block 55 (FIG. 10) are bent in an upward direction by mandrel and wiper block 52. Grooves 266 (FIG. 8) are formed in the side of block 55 nearest assembly 52 to receive the tubes as they are bent upward by assembly 52. In addition, grooves 267 are formed in the top of block 55 to receive the tubes as they are bent from the vertical position to the horizontal position. Bolts 268 are threaded into wall 99 securing block 55 to wall 99.

A variety of different sized bend blocks 55 are used to produce the configured tubes of FIG. 2. For example, a bend block having grooves 266 and 267 (FIG. 8) radiused in a semi-circular path is used to form tube 60 (FIG. 2). On the other hand, a bend block having straight grooves 266 is used for forming the flat middle portion of crossover 61 and the flat long leg of elbow 62. In the latter case, grooves 266 are radiused at their top ends and are blended into grooves 267.

Block 95 is fixedly mounted atop piston rod 35 of hydraulic cylinder 36. Fastened to the back of block 95 by bolts or other suitable means is plate 173 which is parallel with and abuts against front wall 201 of cabinet 37. The bottom edge of plate 173 is sufficiently above plate 34 of cabinet 37 so as to not touch plate 34 when piston rod 35 is in the retracted position thereby placing block 95 in its lowest position. Slide stop block 174 is removably fastened to the back of plate 173 by bolt 175. Block 174 protrudes through an opening in wall 201 and is positioned above the bottom portion of wall 201. Rod 35 of cylinder 36 is retracted only when the apparatus is producing the crossover tubes 61 (FIG. 2) or extra long 90° elbows 62. By selecting and installing different sizes of block 174, only a specified amount of downward travel will occur since the bottom of block 174 will eventually abut wall 201 preventing further vertical travel.

Mounted to bearing housing 200 is an adjustable stop assembly 217 and stop block 216. Bolts 215 are threadedly received into the end of housing 200 securing block 216 thereon. A perspective view of adjustable stop assembly 217 is shown in FIG. 11. Body 226 of assembly 217 is clamp-like with hole 227 receiving housing 200 and having bolt 231 for tightening the top and bottom portions of body 226 on housing 200. An arm 229 fixedly fastened to rod 228 pivots in the direction of arrows 232 or 233 when hydraulic cylinder 223 is energized. Rod 228 extends through body 226 and is fastened to arm 234 rotatably mounted to the top of piston rod 224 by fastener 225. Cylinder 223 is mounted by fastener 235 to boss 236 welded to body 226. Markings 237 from zero to 180 are scribed in body 226. Adjustable stop 217 will mechanically stop the rotation of spindle 191 and mandrel and wiper block assembly 52 when arm 229 abuts against stop block 207 (FIG. 10). A line scribed on the outside surface of housing 200 is matched against markings 237 depending on the amount of rotation of spindle 191 desired. Release of assembly 217 permits additional rotation and is accomplished by energizing cylinder 223 and causing rod 224 to extend moving arm 229 in the direction of arrow 232. Cylinder 223 is operated by limit switch LS368 (FIG. 10) which is actuated by stop block 174.

SAW ASSEMBLY

After the tubes have been bent to the desired configuration, mandrel and wiper blocks 52 are retracted and power is applied to saw assembly 45 (FIG. 1 and 10) causing saw blade 47 to enter gap 48 cutting the configured tubes from the continuous lengths. Referring to FIG. 1, saw assembly 45 is mounted to arm 42 extending outwardly and upwardly from cabinet 37. Arm 42 may be fastened to cabinet 37 by any number of means such as by welding the end of the arm to the front wall of the cabinet. A U-shaped bracket 254 (FIG. 10) is pivotally mounted by nut 259 and bolt 255 passing through arm 42 and walls 256 and 257 (FIG. 1) of bracket 254. A cross bar 258 bolted to the ends of walls 256 and 257 is pivotally fastened to the end of piston rod 44 of hydraulic cylinder 43 by fasteners 253 (FIG. 10). Cylinder 43 is mounted to boss 251 by fasteners 252. Boss 251 is welded to the upward extending portion of arm 42. Referring once again to FIG. 1, housing 260 is mounted to the top ends of walls 256 and 257 having an electric motor 46 mounted on one end for rotating saw blade 47. A freely rotatable shaft within housing 260 is threaded on one end for receiving bushing nut 261. Saw blade 47 is fixedly mounted on the shaft and is secured thereon by bushing nut 261. The shaft is geared on its opposite end to motor 46 for transmitting rotational power from motor 46 to saw blade 47. A protective cover is provided around a portion of saw blade 47 for safety purposes. In order to limit the movement of saw assembly 45 in the direction of arrow 49, adjustable screw 262 is threaded through cross bar 258 with a top end 263 for abutting against surface 264 of arm 42. At the conclusion of the bending cycle, hydraulic cylinder 43 is actuated extending cylinder rod 44 and pivoting saw assembly 45 inwardly. The rotating saw blade 47 enters gap 48 trimming first the free ends of the configured tubes and then sawing the tubes free from the tubing stock. Saw assembly 45 is automatically retracted when end 263 of adjustable screw 262 abuts against surface 264 of arm 42.

STRIPPER

Subsequent to the sawing operation, the configured tubes are forced away from bend block 55 by a stripper operated by hydraulic cylinder 85. Referring to FIGS. 1 and 3, hydraulic cylinder 85 is mounted between rails 82 and 83 to block 84 which is fixedly fastened to plate 75. The slidable piston rod 86 of cylinder 85 is fastened to U-shaped member 92 straddling carrier 90. Fastener 91 passes through the necked down portion 89 of carrier 90 and both arms of U-shaped member 92 securing the carrier and piston rod together. Carrier 89 is slidably mounted on rails 82 and 83 by hollow cylinders 87 and 88 fixedly connected to its top and bottom. Thus, as piston rod 86 moves horizontally, carrier 90 will move toward or away from bend clamp 41. Mounted to both sides of carrier 90 (FIG. 1) by fasteners 279 are upwardly extending arms 270 and 271 spaced apart with a top pair of fingers 271' and a lower pair of fingers 272 integrally attached thereon. Five rods 273 are fixedly attached by welding to cross bar 274 joining the top pair of fingers 271' together. Likewise, five rods 275 are fixedly attached by welding to cross bar 276 joining the lower pair of fingers 272 together. Rods 273 slide freely through stripper holes 140 (FIG. 5) of bend clamp 41 crossing gap 48 shown in FIG. 1 and through stripper holes 277 (FIG. 10) of bend block 55. Likewise, rods 275 slide freely through stripper holes 141 (FIG. 5) of bend clamp 41 crossing gap 48 and through stripper holes 278 (FIG. 10) of bend block 55. Thus, to remove the configured tubes, cylinder 85 (FIG. 1) is activated causing rod 86 to move carrier 90 towards bend clamp 41 thereby forcing the stripper rods out through bend block 55 against the free configured tubes resting thereon. After the configured tubes fall from bend block 55 into a suitable container, the stripper rods are withdrawn by retracting rod 86 of cylinder 85.

HYDRAULIC SYSTEM DESCRIPTION

Figure 12:
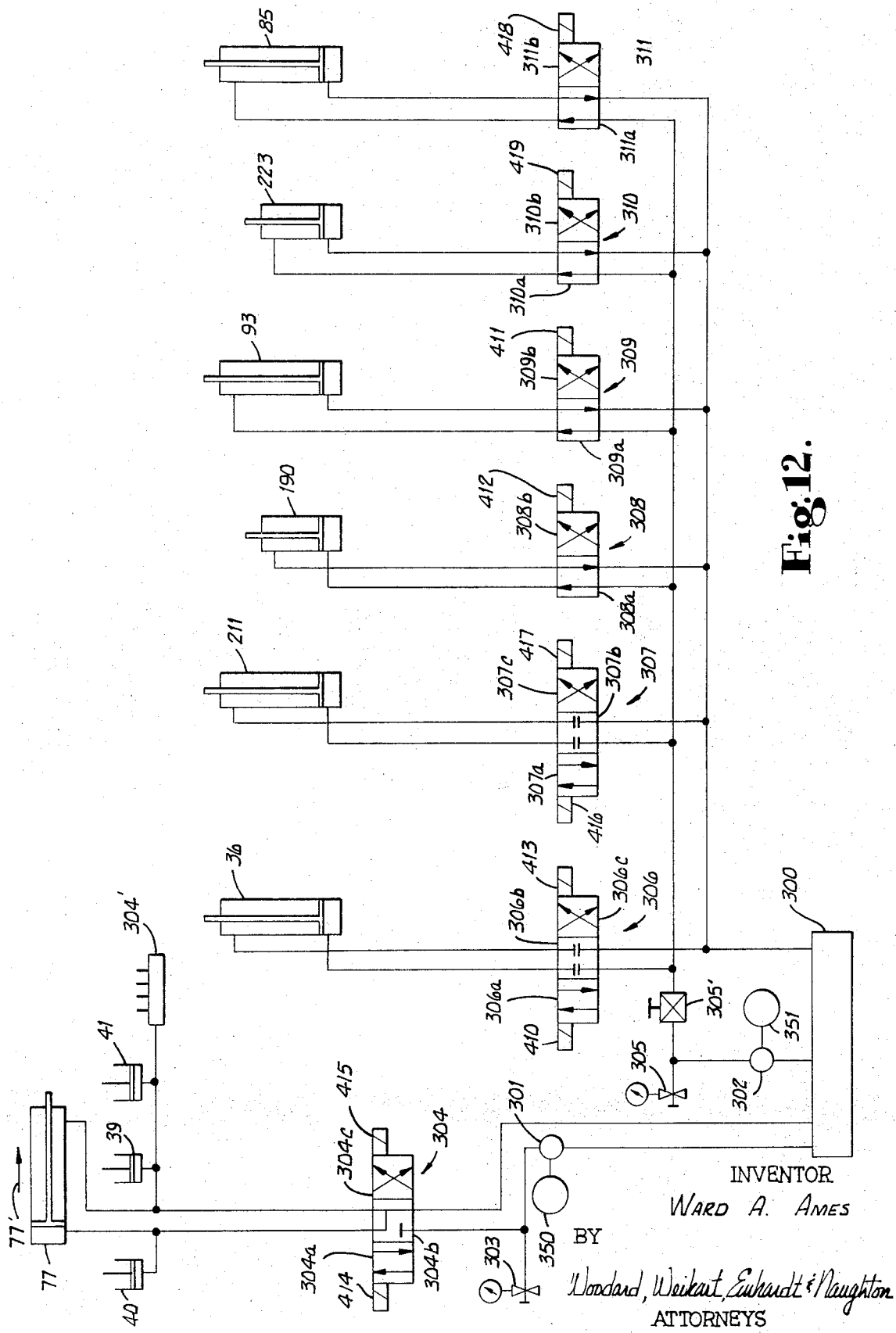
FIG. 12 is a detailed diagram of the hydraulic system for the apparatus of FIG. 1.

Referring to FIG. 12 there is illustrated a diagram of the hydraulic system of the present apparatus which has a hydraulic tank 300 and two pumps 301 and 302. Pumps 301 and 302 are respectively operated by electric motors 350 and 351. Pump 301 is connected to shut off valve and pressure indicator 303 and provides pressurized hydraulic fluid to valve 304 to operate the clamping systems of clamp unit 39, feed unit 40 and bend clamp 41. In addition, the fluid provided by pump 301 operates cylinder 77 for feeding stock tubing to the bending apparatus. The piston of cylinder 77 is shown in the position corresponding to feed unit 40 being located adjacent clamp unit 39. Valve 304 has three positions 304A, 304B and 304C. In the 304A position, pressurized fluid is applied to the piston of feed unit 40, thereby causing it to firmly clamp the tube stock. At the same time, pressurized fluid is applied to the piston of cylinder 77 causing feed unit 40 to move in the direction of arrow 77' (FIG. 1) towards bend clamp 41 thereby advancing the tube stock. Valve 304 is then shifted to the 304B position releasing the pressurized fluid back to tank 300 and causing feed unit 40 to release the tube stock. Next, valve 304 shifts to the 304C position wherein pressurized fluid is applied to the pistons of clamp unit 39 and bend clamp 41 securing the tube stock during the bending operation. At the same time, fluid is routed to cylinder 77 causing feed unit 40 to divert back to its original position against clamp unit 39. Conventional oil injectors 304' receive oil from valve 304 when the valve is in the 304C position. The oil injectors are connected to various points for lubricating moving parts of the machine. The lubrication system for the tube mandrels, which has to connect to chamber 171, is a separate unit. The application requires that rather than pure oil, which is discharged from injectors 304, atomized air and oil must be used in order to insure proper lubrication without an excess of oil.

Pump 302 is also connected to a shut off valve and pressure indicator 305 and through a manual on-off valve 305' to six valves 306 through 311. Valve 306 allows the pressurized fluid to operate cylinder 36 for vertically moving the entire feed and clamp assembly 33. In the 306A position, fluid is applied through valve 306 to cylinder 36 causing feed and clamp assembly 33 to move in the upward direction. In order to move feed and clamp assembly 33 in the downward direction, valve 306 is shifted to the 306C position, thereby applying pressurized fluid to the opposite side of the piston within cylinder 36. Valve 307 allows pressurized fluid to flow to cylinder 211 for rotating mandrel and wiper block 52. In the 307A position, fluid is routed through valve 307 and applied to the piston of cylinder 211 causing mandrel and wiper block 52 to rotate in the clockwise direction as viewed from the front of the machine as shown in FIG. 1, thereby bending the tube stock around bend block 55. In order to rotate mandrel and wiper block 52 in a counterclockwise direction back to its original position, valve 307 is shifted to the 307C position, thereby routing pressurized fluid to the opposite side of the piston within cylinder 211. Mandrel and wiper block 52 is moved in the horizontal direction by activating cylinder 190. Pressurized fluid is applied to cylinder 190 through valve 308. In the 308A position pressurized fluid is routed to cylinder 190 causing mandrel and wiper block 52 to move away from bend clamp 41. In order to force mandrel and wiper block 52 to move horizontally toward bend clamp 41, valve 308 is shifted to the 308B position. Saw assembly 45 is pivoted inward to cut the configured tubes from the tube stock by pressurized fluid being applied to cylinder 43 by valve 309 in the 309B position. The saw is withdrawn and pivoted in the outward direction when valve 309 is in the 309A position. Valve 310 in the 310B position routes pressurized fluid to cylinder 223 of adjustable stop assembly 217 (FIG. 11) releasing arm 229 and allowing mandrel and wiper block 52 to rotate. In the 310A position, pressurized fluid is routed to cylinder 223, thereby rotating arm 229 in the direction of arrow 233 contacting stop block 207, preventing rotation of mandrel and wiper block 52. The last valve 311 in the 311A position routes pressurized fluid to stripper cylinder 85 shown in FIG. 1 causing the stripper rods to move against the configured tubes forcing the tubes from bend block 55. In the 311B position, pressurized fluid is applied to cylinder 85 causing the stripper rods to retract. Of course, all of the above valves are operated in conjunction with various electrical controls. Each hydraulic valve has a pair of standard solenoids to operate the valve from one position to another. For example, valve 306 has solenoid 410 for forcing the valve to the 306A position and solenoid 413 for forcing the valve to the 306C position. Valve 306 reverts to the 306B position when both solenoids are deactivated.

ELECTRICAL CIRCUIT DESCRIPTION

The following relay coils control the following electrical contacts:

| Relay Coil | Contacts |
| --- | --- |
| 400 | 384 |
| 401, 403 | 397, 398, 389, 390 |
| 402, 405 | 382, 387, 399, 393 |
| 404 | 383, 388, 392, 605 |
| 406 | 394 |
| 407 | 385 |
| 408 | 380, 381, 391, 386, 395, 396 |
| 600 | 609 |
| 601 | 603 |

Various limit switches are provided throughout the automatic tube bending machine. Limit switches 365 and 366 are shown in FIG. 3, with limit switches 364 and 372 shown in FIG. 8 and limit switches 367–371 shown in FIG. 10. Limit switches 361–363 are not shown in the drawing but are mounted to the upstanding portion of arm 42 (FIG. 1) at location 42' contacting walls 256 and 257. As previously discussed, the present apparatus has the capability to produce the four differently configured tubes in FIG. 2. In order to produce a certain configuration, switches 352 and 353, shown in FIG. 13, must be properly set in advance. Switch 352 is a two-way switch allowing the machine to be operated either manually or automatically. Switch 353 is a four-way switch to be set to one four configurations. Coils 402 and 405 are for a single mechanical latching relay. Coil 402 positions contacts 382, 387, 393 and 399 in the position shown in FIG. 13 with coil 405 reversing the contacts to their other position. Coils 401 and 403 are for another single mechanical latching relay with coil 403 positioning contacts 389, 390, 397 and 398 in the position shown in FIG. 13, with coil 401 reversing the contacts to their other position. Relays 400, 406, 407, 600 and 601 are double pole double throw, and relays 404 and 408 are three pole double throw. Limit switches 362-369, and 372 are two circuit, double break, momentarily contact, spring return switches. Limit switches 361 and 370 are force circuit, double break, momentary contact, spring return switches. Limit switch 371 is a two circuit, double break, maintained contact switch. Limit switch 373 is a two circuit, double break, pressure actuated switch which operates on rising pressure adjustable from 135 psi to 1,000 psi.

Figure 13:
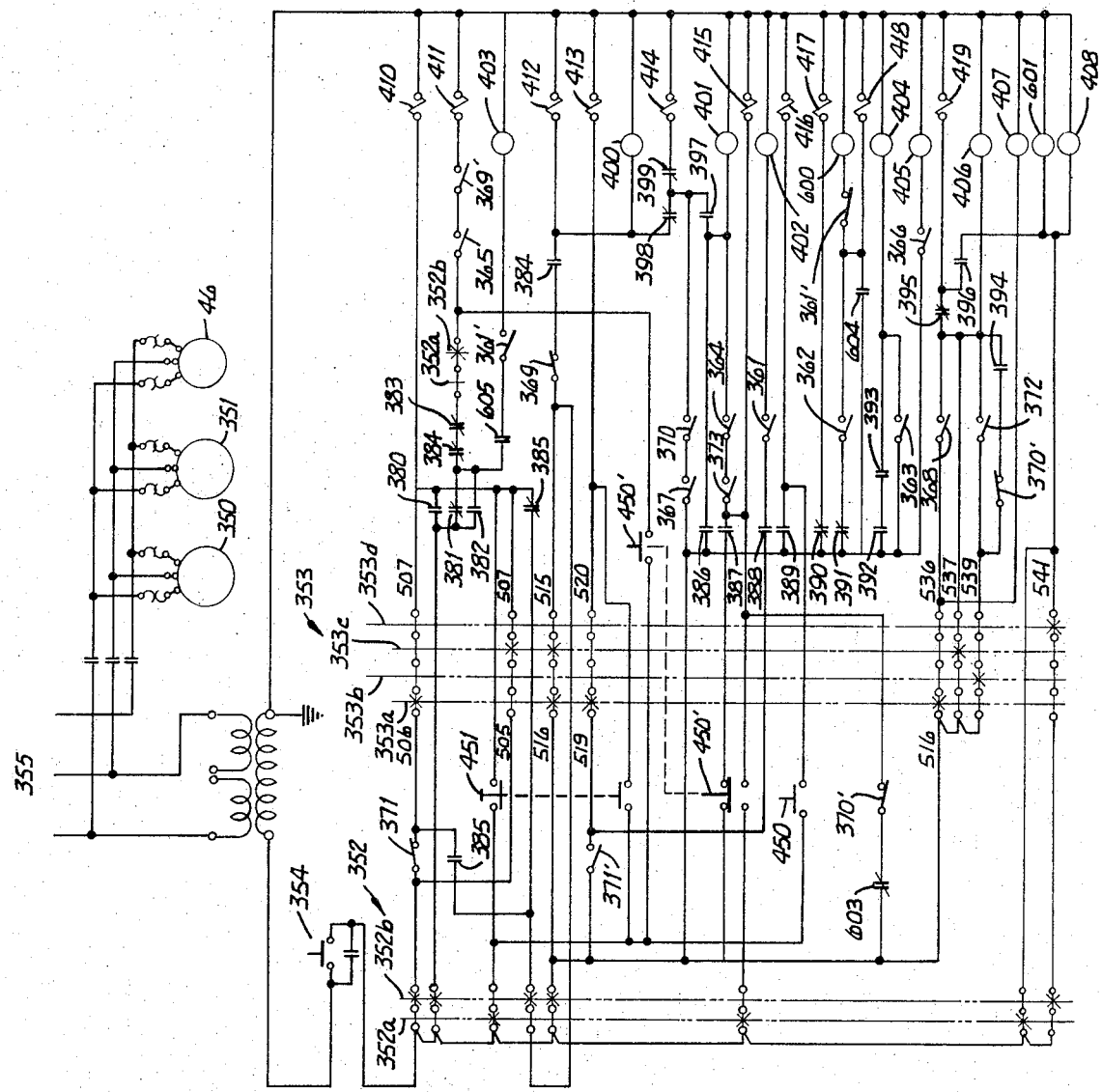
FIG. 13 is a schematic diagram of the electrical circuitry for the apparatus of FIG. 1.

Assuming the machine to be operated automatically, the first operation to be described will be for producing the straight configured tube 63 (FIG. 2). Referring now to FIG. 13, switch 352 is set in the 352B position and switch 353 is set in the 353D position. Next switch 354 is closed starting the machine. Electrical energy from source 355 operates saw motor 46, and hydraulic pumps 350 and 351 and passes through starting switch 354 and switch 352. Power is applied through switches 352 and 353 via switch contacts 516 and 541 to relay coils 408 and 601 energizing relay coils 408 and 601 throughout the cycle for producing straight tubing. Activation of coil 601 results in opening of normally closed contacts 603. Relay coil 408 has normally open contacts 380, 386 and 396 and normally closed contacts 381, 391 and 395. Thus these contacts will respectively close and open when power is applied to coil 408. Normally open relay contacts 396 are closed when relay coil 408 is energized thereby applying power to solenoid 419 (FIGS. 12 and 13) forcing valve 310 to the 310B position thereby allowing mandrel and wiper block 52 to rotate. Solenoid 419 remains energized throughout the cycle for producing the straight configured tubes 63. Activation of relay coil 408 also results in the closing of the normally open relay contacts 386 thereby applying power to relay coil 401. Coil 401 remains energized throughout the cycle for producing straight configured tubes. As a result of the power applied to relay coil 401, normally open relay contacts 389 close, thereby applying power from switch 352 to solenoid 416 which moves valve 307

(FIG. 12) to the 307A position, thereby causing mandrel and wiper block 52 to rotate 180° in the clockwise direction as viewed from the front of the machine as shown in FIG. 1. Activation of relay coil 401 also results in the closing of normally open contacts 397 thereby routing power from closed relay contact 386 through normally closed contacts 399 to solenoid 414 forcing valve 304 (FIG. 12) to the 304A position. Fluid is thereby routed to the piston of feed unit 40 clamping the stock tubing. In addition, the fluid is routed through valve 304 to hydraulic cylinder 77 forcing feed unit 40 to pull the stock tubing towards bend clamp 41. Limit switch 366 is positioned to close when feed unit 40 is nearest bend clamp 41. The closing of limit switch 366 applies power to relay coil 405 thereby opening its normally closed relay contacts 399 and interrupting the flow of power to solenoid 414 allowing valve 304 to revert to the 304B position, releasing the pressure on the clamping piston of feed unit 40. The activation of relay coil 405 also results in the closing of its normally open relay contacts 387 thereby applying power to solenoid 415 forcing valve 304 to the 304C position, applying fluid power to the clamping piston of clamp unit 39 and bend clamp 41. Fluid power is also applied to cylinder 77 causing feed unit 40 to revert back against clamp unit 39. Limit switches 365 and 372 are positioned to close when cylinder 190 has retracted its piston rod and thus mandrel and wiper block 52 is nearest bend block 55. Limit switch 369 is positioned to open its contacts 369 and to close its contacts 369' when wiper and mandrel block assembly 52 is rotated on top of bend block 55. Thus, in the present case, limit switch 365 and contacts 369' are closed applying power to solenoid 411 from normally closed relay contacts 384 and 383 and the closed relay contact 382 resulting from activation of relay coil 405. Application of power to solenoid 411 causes valve 309 to revert to the 309B position, thereby applying fluid force to hydraulic cylinder 43. Activation of cylinder 43 forces saw blade 47 into gap 48 thereby cutting the tubes from the continuous tubing stock. Limit switch 363 is positioned to close when saw spindle assembly 45 severs all of the tubing stock. Thus, as limit switch 363 closes, power is applied to relay coil 404 causing its normally closed relay contact 383 to open and its normally open contacts 388, 392, and 605 to close, thereby interrupting the flow of electrical energy to solenoid 411 allowing valve 309 to revert to the 309A position and causing saw spindle assembly 45 to revert back to its original position. Limit switch 361 is positioned to close when saw spindle assembly 45 reaches its original position as shown in FIG. 1. Thus, limit switch 361 closes allowing flow of electrical energy to relay coil 402. Upon activation of relay coil 402, its relay contacts 393 revert to the normally open position preventing flow of electrical energy to relay coil 404. Likewise, activation of relay coil 402 causes its relay contacts 387 to revert to their normally open position, thereby preventing flow of electrical energy to solenoid 415. The cycle is started over by power being applied through the normally closed contacts 399 to solenoid 414.

To set the machine properly to produce the return tubes 60 of FIG. 2, switch 353 should be set to the 353C position, thereby applying power through switches 352 and the electrical switch contacts 505 and 507 of switch 353 to solenoid 410, causing valve 306 to revert to the 306A position maintaining feed and clamp assembly 33 (FIG. 1) in the most upward position throughout the cycle. Likewise, power is applied through electrical switch contacts 516 and 537 of switch 353 through the normally closed relay contacts 395 to solenoid 419 forcing valve 310 to revert to the 310B position allowing mandrel and wiper block 52 to rotate when power is applied to cylinder 211. Likewise, power is applied through electrical switch contact 516 and 537 to relay coil 406 throughout the cycle causing its normally open contacts 394 to close. Limit switch 367 is positioned to close when feed and clamp assembly 33 is in the most upward position. Thus, switch 367 is now closed. Limit switch 364 is positioned to close when the mandrels have engaged the tubing. Limit switch 370 is arranged to open its normally closed contacts 370' and to close its normally open contacts 370 when cylinder 190 has its piston rod extended and thus when mandrel and wiper block 52 is back from bend block 55. Thus, power is applied through limit switches 367 and contact 370, through the normally closed relay contacts 399, thereby applying power to solenoid 414 causing feed unit 40 to feed the tubing stock towards bend clamp 41. Likewise, power is applied through the normally closed relay contacts 398 thereby activating relay coil 400 and solenoid 412. Coil 400 will then open its contacts 384. Activation of solenoid 412 forces mandrel bodies 197 (FIG. 9) to enter the tubing stock. Limit switch 366 closes when feed unit 40 is nearest bend clamp 41, thereby applying power to relay coil 405 which opens its relay contacts 399 thereby interrupting flow of electrical energy to solenoid 414. Solenoid 415 is energized since activation of relay coil 405 results in the closing of relay contacts 387. Activation of solenoid 415 allows feed unit 40 to retract. Limit switch 373 is positioned to close when the clamping pressure of clamp 39 and bend clamp 41 is sufficiently great to secure the tubing stock. Limit switch 373 may for example have pressure sensors in the hydraulic fluid cavities behind the pistons of clamp unit 39 and bend clamp 41 for determining the pressure exerted on the tube. Thus, when clamp pressure builds enough to close limit switch 373 and the mandrels advance inward to close limit switch 364, relay coil 401 is energized closing its normally open relay contacts 389 and activating solenoid 416 starting the rotation of mandrel and wiper block assembly 52. Limit switch 364 (FIG. 8) is positioned to close when rod 194 is retracted. The mandrel and wiper block 52 rotates 180° until it is positioned on top of bend block 55 and bend clamp 41, thereby opening normally closed limit switch contacts 369 deenergizing solenoid 412, and relay coil 400, and closing normally open limit switch contacts 369'. Limit switch 365 closes when the mandrel bodies 197 are fully retracted and to the right of the configured tubes as viewed from the front of the apparatus. Solenoid 411 is thereby energized forcing saw spindle assembly 45 inwardly to cut the configured tubes. Limit switch 363 is closed at the end of the saw stroke energizing relay coil 404 and causing its normally closed relay contacts 383 to open thereby interrupting the flow of electrical energy to solenoid 411 thereby retracting saw and spindle assembly 45. As the saw assembly retracts, limit switch 362 is positioned to momentarily close permitting solenoid 418 to be energized and then deenergized thereby forcing the configured tubes from bend block 55. Relay coil 403 is also energized since contacts 605 of relay 404 are closed and since limit switch 361' normally open contacts are closed thereby allowing contacts 390 of relay 403 to close applying power to solenoid 417 returning the mandrel and wiper block 52 from the 180 degree position to the original position. Limit switch 361 closes when the saw retracts fully, energizing relay coil 402 which in turn opens its relay contacts 393 deactivating relay coil 404. Normally open limit switch contacts 370 close when mandrel and wiper block assembly 52 is returned to its original position allowing the cycle to be repeated.

To set the machine properly to produce the elbow configured tubes 62 of FIG. 2, switch 353 should be set to the 353B position, thereby applying power through switches 352 and the electrical switch contacts 516 and 536 of switch 353 to relay coil 407 and opening its contacts 385 for the entire cycle. Limit switch 367 is closed since feed and clamp assembly 33 is in the most upward position. Limit switch 370 is arranged to open its normally closed contacts 370' and to close its normally open contact 370 when mandrel and wiper block 52 is back from bend block 55. Thus, power is applied through limit switches 367 and contact 370, through the normally closed relay contacts 399 thereby applying power to solenoid 414 causing feed unit 40 to feed the tubing stock towards bend clamp 41. Likewise, power is applied through the normally closed relay contacts 398, thereby activating relay coil 400 and solenoid 412. Coil 400 will then open its contacts 384. Activation of solenoid 412 forces mandrel bodies 197 (FIG. 9) to enter the tubing stock. Limit switch 366 closes when feed unit 40 is nearest bend clamp 41 thereby applying power to relay coil 405 which opens its relay contacts 399 thereby interrupting flow of electrical energy to solenoid 414. Solenoid 415 is energized since activation of relay coil 405 results in the closing of relay contacts 387. Activation of solenoid 415 allows feed unit 40 to retract. Limit switch 373 is positioned to close when the clamping pressure of clamp unit 39 and bend clamp 41 is sufficiently great to secure the tubing stock. Thus, when clamp pressure builds enough to close limit switch 373 and the mandrels advance inward to close limit switch 364, relay coil 401 is energized closing its normally open relay contacts 389 and activating solenoid 416 starting the rotation of mandrel and wiper block assembly 52. Limit switch 364 (FIG. 8) is positioned to close when rod 194 is retracted. The mandrel and wiper block 52 rotates until the rotation is stopped when arm 229 (FIG. 11) abuts against stop block 207 at a pre-set point. Limit switch 371 is positioned at this point to open its normally closed contacts 371 and to close its normally open contacts 371'. Thus, electrical energy does not flow through contacts 371 and solenoids 412 and 410 and relay 400 are deenergized. Electrical energy is routed through contacts 371' and solenoid 413 is energized. If the elbow is anything but 90°, a special stop block 174 (FIG. 10) is used to prevent assembly 33 from lowering. If the elbow is 90°, then solenoid 413 will cause body 95 to lower. As mandrel bodies 197 exit the tubing stock as a result of activation of cylinder 190 by deactivation of solenoid 412, limit switch 372 is positioned to close energizing solenoid 419. Solenoid 419 releases arm 229 (FIG. 11) and relay 406 activates. Mandrel and wiper block 52 then continues to rotate with the mandrel bodies retracted to the 180° position closing contacts 369' and opening contacts 369. Limit switches 365 and 369' close when the mandrels retract and the bend head reaches the 180° position, thereby energizing solenoid 411. Limit switch 363 is closed when the saw pivots in cutting the tubes thereby energizing relay coil 404 and causing its normally closed relay contacts 383 to open thereby interrupting the flow of electrical energy to solenoid 411 and thereby retracting saw and spindle assembly 45. As saw assembly 45 retracts, momentarily closing of limit switch 362 permits solenoid 418 to be energized and then deenergized stripping the configured tubes from bend block 55. Relay coil 403 is energized thereby allowing its relay contacts 390 to close applying power to solenoid 417 by returning the mandrel and wiper block 52 from the 180° position to the original position. Limit switch 361 closes when the saw retracts fully, energizing relay coil 402, which in turn opens its relay contacts 393 deactivating relay coil 404. As mandrel and wiper block 52 rotate counterclockwise, as viewed from the front of the assembly, back to its original position, it passes through the 90° position resetting limit switch 371, thereby deenergizing solenoid 413 and energizing solenoid 410. When it reaches the 0° position, contacts 370' open deenergizing solenoid 419 and relay 406 setting the mechanical stop for the next cycle. In addition, contacts 370 close energizing solenoids 412 and 414 and relay 400, starting the cycle over.

To set the machine to produce the crossover tube 61 of FIG. 2, switch 353 should be set to the 353A position. The operation of the apparatus for producing the crossover tube 61 is identical as that described for producing the elbows 62. The apparatus operates the same until the mandrel and wiper block rotates. The rotation is stopped at the 90° position by arm 229 (FIG. 11) abutting against stop block 207, whereupon contacts 371 open deenergizing solenoid 410. Contacts 371' close energizing solenoid 413 thereby moving the body 95 down. Limit switch 368 closes when the slide reaches its downward limit energizing solenoid 419 which releases arm 229. Mandrel and wiper block 52 then rotates around to the 180° position opening contacts 369 and closing contacts 369' deenergizing solenoid 412 and relay 400.

The remaining steps are identical to those for the elbow tube with assembly 33 rising returning limit switch 368 to its normal configuration, deenergizing solenoid 419, and setting arm 229 for the next cycle. As assembly 33 rises, limit switch 367 closes and limit switch 370 reverts to its original position when mandrel and wiper block 52 is back to the 0° position.

The apparatus may be operated manually by setting switch 352 to the 352A position. Switch 450 is a manual switch for operating the rotation of mandrel and wiper block 52. Switch 450 in the engaged position causes block 52 to rotate clockwise as viewed from the front of the apparatus. Switch 451 in the up position raises assembly 33 and in the down position lowers assembly 33. Switch 450' in the closed position applies power to solenoid 411 causing the saw to pivot in thereby cutting the tubes.

It will be obvious from the above description that the present invention provides an apparatus which will produce straight lengths of tubes, elbow configured tubes, semi-circular tubes, and crossover tubes from continuous lengths of tubing. It will be further evident from the above description that the present apparatus will produce elbow configured tubes having a controlled angle of bend and which will bend and cut multiple lengths of tubing simultaneously. In addition, it will be obvious that the present apparatus may be operated automatically or manually.

While the invention has been disclosed and described in some detail in the drawings and foregoing description, they are to be considered as illustrative and not restrictive in character, as other modifications may readily suggest themselves to persons skilled in this art.

The invention claimed is:

1. A bending and severing apparatus for producing individual configured tubes from continuous lengths of tubing comprising:
   a frame;
   a bend block removably mounted on said frame and having a surface and a groove outlining said configured tubes;
   a feed unit mounted to said frame and having a controlled clamp for holding said tubing;
   feed means operable to force said feed unit a predetermined distance to and from said bend block;
   a bend clamp mounted on said frame between said bend block and said feed unit, said bend clamp having a clamp securing said tubing whenever said feed unit is not moving to and from said bend block;
   a mandrel aligned with said groove and engageable with the end of said tubing being rotatable about said bend block;
   cutting means operable to sever said configured tubes from said tubing;
   a shaft rotatably mounted to said frame;
   a cylinder housing fixedly mounted to said shaft and having an extendable piston rod; and,
   a mandrel and wiper block with said mandrel mounted thereon, said mandrel and wiper block connected to said piston rod and movable to and from said bend block as said piston rod is moved with respect to said cylinder housing, said mandrel and wiper block being pivoted about said bend block as said shaft is rotated.

2. A bending and severing apparatus for producing individual configured tubes from continuous lengths of tubing comprising:
   a frame;
   a bend block removably mounted on said frame and having a surface and a groove outlining said configured tubes;
   a feed unit mounted to said frame and having a controlled clamp for holding said tubing;
   feed means operable to force said feed unit a predetermined distance to and from said bend block;
   a mandrel aligned with said groove and engageable with the end of said tubing being rotatable about said bend block;
   cutting means operable to sever said configured tubes from said tubing;
   stop means operable to limit rotation of said mandrel;
   a stripper mounted to said frame operable to force said configured tubes away from said bend block;
   a tube guide mounted to said frame receiving said tubing;
   a clamp unit mounted to said frame between said feed unit and said tube guide; said clamp unit having a hydraulically operated clamp securing said tubing;
   a bend clamp fixedly mounted on said frame between said bend block and said feed unit, said bend clamp having a hydraulically operated clamp securing said tubing whenever said tubing is secured by said clamp unit.

3. The apparatus of claim 2 additionally comprising:
   a plurality of mandrels; and
   a plurality of tube guides.

4. The apparatus of claim 2 wherein:
   said feed means is a first hydraulic cylinder motor mounted to said frame, said motor has a movable piston rod extending freely through said clamp unit and fixedly fastened to said feed unit; and
   said cutting means is an electrically operated circular saw movable to and from said configured tubes by a second hydraulic cylinder motor.

5. A bending and severing machine for producing straight tubes, return bend tubes, crossover tubes and elbow tubes comprising:
   a main frame;
   a first and second holder mounted to said frame releaseably securing continuous lengths of tubing;
   a mandrel mounted to said frame aligned and engageable with an end of said tubing;
   a bend block being removably mounted to said frame,
   means on said frame operable to move said mandrel and bend said tubing about said bend block;
   a saw mounted to said frame and movable adjacent said block severing said tubing;
   a feed unit slidably mounted to said frame and operable to feed said tubing to said mandrel; and,
   strippers mounted to said frame and extending through said bend block, said strippers are operable to force a portion of said tubing from said bend block.

6. A tube bending and sawing apparatus comprising:
   a base movable in the vertical direction;
   a first tube clamping unit fixedly mounted atop said base;
   a rail fixedly connected to said base;
   a second tube clamping unit slidably mounted to said rail;
   a third tube clamping unit slidably mounted to said rail between said first unit and said second unit;
   feed control means operable to force said third unit to and from said first unit;
   a die removably mounted to said base;
   a saw pivotally mounted between said die and said first unit; and a mandrel and wiper block movably mounted to said apparatus and rotatable about said die.

7. The apparatus of claim 6 additionally comprising:
tube strippers mounted to said base and extendable through said first unit and said die.

8. The apparatus of claim 7 additionally comprising:
a cylinder affixed to said mandrel and wiper block; and
an adjustable stop assembly mounted around said cylinder having a movable arm operable to limit the rotation of said mandrel and wiper block.

9. The apparatus of claim 1 and further comprising:
stop means mounted on said frame adjacent said shaft being operable to controllably limit rotation of said shaft.

10. The machine of claim 5 wherein:
said bend block has a semi-circular curved surface outlining said return bend tubes.

11. The machine of claim 5 wherein:
said bend block has a "["-shaped surface outlining said crossover tubes.

12. The machine of claim 5 wherein:
said bend block has an L-shaped surface outlining said elbow tubes.

* * * * *